United States Patent
Krebs

(10) Patent No.: US 10,637,888 B2
(45) Date of Patent: Apr. 28, 2020

(54) AUTOMATED LIFECYCLE SYSTEM OPERATIONS FOR THREAT MITIGATION

(71) Applicant: SAP SE, Walldorf (DE)

(72) Inventor: Rouven Krebs, Ettlingen (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 15/672,644

(22) Filed: Aug. 9, 2017

(65) Prior Publication Data

US 2019/0052675 A1    Feb. 14, 2019

(51) Int. Cl.
*H04L 29/04* (2006.01)
*H04L 29/06* (2006.01)

(52) U.S. Cl.
CPC ...... *H04L 63/1491* (2013.01); *H04L 63/1416* (2013.01)

(58) Field of Classification Search
CPC .............. H04L 63/1491; H04L 63/1416
See application file for complete search history.

(56) References Cited

U.S. PATENT DOCUMENTS

| | | |
|---|---|---|
| 6,775,657 B1 | 8/2004 | Baker |
| 6,827,578 B2 | 12/2004 | Krebs et al. |
| 6,839,850 B1 | 1/2005 | Campbell et al. |
| 7,080,378 B1 * | 7/2006 | Noland ................. G06F 9/5083 709/224 |
| 7,181,768 B1 | 2/2007 | Ghosh et al. |
| 7,313,618 B2 | 12/2007 | Braemer et al. |
| 7,844,829 B2 | 11/2010 | Meenakshisundaram |
| 8,644,755 B2 | 2/2014 | Krebs et al. |
| 9,450,981 B2 * | 9/2016 | Doron ................. H04L 63/1458 |
| 9,936,008 B2 * | 4/2018 | Elias .................... H04L 41/5058 |
| 2003/0151629 A1 | 8/2003 | Krebs et al. |
| 2003/0152899 A1 | 8/2003 | Krebs et al. |

(Continued)

FOREIGN PATENT DOCUMENTS

WO    WO-2009032379 A1 *    3/2009    ............ G06F 21/55

OTHER PUBLICATIONS

U.S. Appl. No. 15/665,700, 20190042736, Rouven Krebs, filed Aug. 1, 2017.

(Continued)

*Primary Examiner* — Catherine Thiaw
(74) *Attorney, Agent, or Firm* — Fish & Richardson P.C.

(57) ABSTRACT

Techniques are described for automatically performing lifecycle operations to mitigate identified threats via an intrusion detection (IDS) system and a lifecycle operations manager (LOM). In one example, a notification from an IDS is received at a LOM, the notification indicating a malicious activity associated with a particular application included in an enterprise software environment monitored by the IDS. The application can be associated with a first endpoint accessible via a navigation target, where the navigation target sends requests received at the navigation target to the first endpoint. In response to receiving the notification, automatically and without user input, the LOM executes at least one countermeasure operation including creating a new copy of the application, associating the new copy of the application with a different second endpoint, and updating the navigation target to cause the navigation target to send requests to the new copy of the application at the second endpoint.

20 Claims, 3 Drawing Sheets

(56) References Cited

U.S. PATENT DOCUMENTS

| | | | |
|---|---|---|---|
| 2003/0152900 | A1 | 8/2003 | Krebs et al. |
| 2003/0154176 | A1 | 8/2003 | Krebs et al. |
| 2003/0188189 | A1 | 10/2003 | Desai et al. |
| 2004/0117658 | A1 | 6/2004 | Klaes |
| 2004/0172557 | A1* | 9/2004 | Nakae ............... H04L 63/0227 726/22 |
| 2007/0073519 | A1 | 3/2007 | Long |
| 2009/0248473 | A1 | 10/2009 | Doenig et al. |
| 2010/0094886 | A1 | 4/2010 | Krebs |
| 2010/0107247 | A1* | 4/2010 | Shani ................ G06F 21/552 726/22 |
| 2010/0212013 | A1 | 8/2010 | Kim et al. |
| 2010/0306337 | A1* | 12/2010 | DeHaan ............... G06F 1/266 709/213 |
| 2012/0030316 | A1* | 2/2012 | Dougherty ............ G06F 16/41 709/219 |
| 2014/0298469 | A1* | 10/2014 | Marion ................. G06F 21/55 726/23 |
| 2015/0033322 | A1 | 1/2015 | Wang et al. |
| 2015/0237067 | A1 | 8/2015 | Talyansky |
| 2017/0169217 | A1 | 6/2017 | Rahaman et al. |
| 2018/0034847 | A1* | 2/2018 | Stella ................ H04L 41/0896 |

OTHER PUBLICATIONS

U.S. Appl. No. 15/665,758, 20190042737, Rouven Krebs, filed Aug. 1, 2017.

\* cited by examiner

AUTOMATED LIFECYCLE SYSTEM OPERATIONS FOR THREAT MITIGATION

TECHNICAL FIELD

The present disclosure relates to techniques for automatically performing lifecycle operations to mitigate identified threats through interactions between a threat or intrusion detection system and a lifecycle operations management system.

BACKGROUND

Since the first computer resources have been shared, information technology (IT) security is a topic of continually increasing importance. With emerging data networks several decades ago to the recent emergence of cloud computing, IT security has become a major differentiator for software vendors and security providers. New legal restrictions in various jurisdictions make software vendors more responsible for initially securing their software and cloud-based offerings.

Combined with the increased value of and requirement for IT security, security experts remain relatively rare and the sheer volume of log files needing to be analyzed for complex systems make it impossible for a human expert to analyze which actions or operations occurring in a monitored system may indicate a threat.

SUMMARY

Implementations of the present disclosure are generally directed to automatically performing lifecycle operations to mitigate identified threats through interactions between a threat or intrusion detection system and a lifecycle operations management system. In one example implementation, a computerized method executed by hardware processors can be performed. The example method can comprise receiving a notification from an intrusion detection system is received at a lifecycle operations manager, the notification indicating a malicious activity associated with a particular application included in an enterprise software environment monitored by the intrusion detection system. The application can be associated with a first endpoint accessible via a navigation target, where the navigation target sends requests received at the navigation target to the first endpoint. In response to receiving the notification, automatically and without user input, the lifecycle operations management system executes at least one countermeasure operation including creating a new copy of the application, associating the new copy of the application with a different second endpoint, and updating the navigation target to cause the navigation target to send requests to the new copy of the application at the second endpoint.

Implementations can optionally include one or more of the following features.

In some instances, the navigation target is associated with a proxy forwarding requests to the first endpoint. In other instances, the navigation target is associated with a redirect pattern to the first endpoint.

In some instances, creating a new copy of the particular application comprises reinstalling the particular application and copying productive data and a configuration associated with the particular application. In other instances, creating a new copy of the particular application comprises using an image of the particular application from a backup storage.

In some instances, the malicious activity is associated with a particular attack vector. In those instances, creating a new copy of the particular application can include moving a copy of the particular application into a new system context without the particular attack vector associated with the particular application.

In some instances, the first and second endpoints represent at least one of a particular uniform resource locator (URL) or a particular uniform resource identifier (URI) associated with the particular application and the new copy of the particular application. In those instances, the navigation target through which the first endpoint is accessible can comprise a link within a portal page in an enterprise portal or any other across system access page to the particular URL or URI associated with the first endpoint of the particular application, and wherein updating the navigation target comprises updating the link within the portal page to a URL or URI associated with the second endpoint of the new copy of the particular application.

In some instances, the second endpoint can be generated by modifying at least one of a hostname, an identifier, and an Internet Protocol (IP) address associated with the first endpoint.

In some instances, the method may further comprise disconnecting the particular application from a network through which the particular application is accessed or moving the particular application to a quarantine network area.

In some instances, the method may further comprise, after creating the new copy of the particular application, associating a honeypot with the first endpoint associated with the particular application.

In some instances, after creating the new copy of the particular application, the method further comprises replacing productive data in the particular application associated with the malicious activity with non-productive data at the first endpoint, installing at least one honeypot monitoring tool in a system executing the particular application at the first endpoint, and allowing access to the non-productive data at the first endpoint monitored by the at least one honeypot. In those instances, the non-productive data may comprise at least one of dummy data, false data, or scrambled data.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
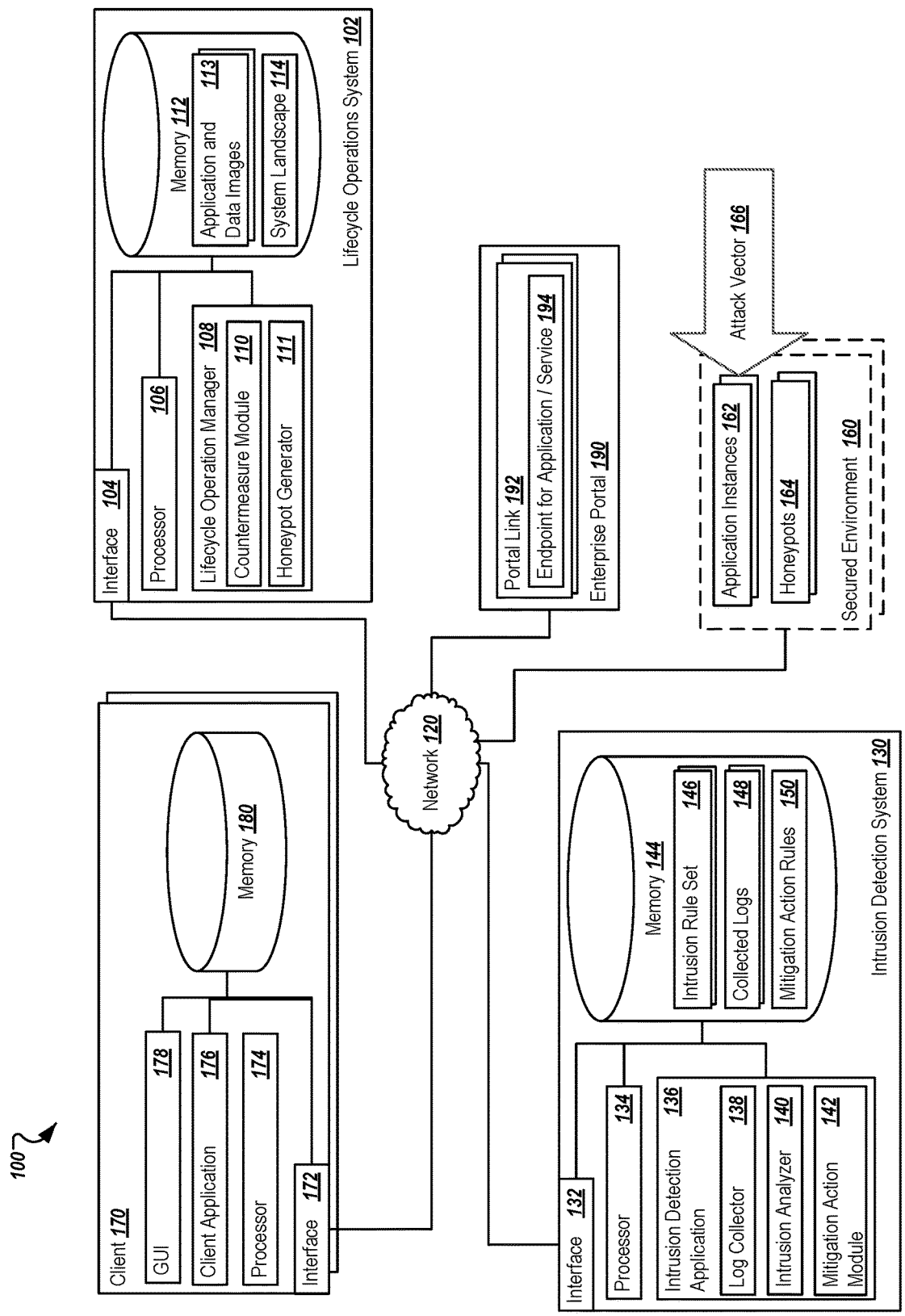
FIG. 1 is a block diagram illustrating an example system for automatically triggering countermeasures through combined interactions of an intrusion detection system and a lifecycle operations system.

The present disclosure relates to techniques for automatically performing lifecycle operations to mitigate identified threats through interactions between a threat or intrusion detection system and a lifecycle operations management system.

IT security can be achieved by different approaches. A first approach focuses on the mitigation of potential attack vectors (e.g., by hardening the applications). A second approach focuses on the early recognition of malicious activities within a secured environment (SE), or malicious activities trying to harm any of the assets of these SEs from the outside. The latter approach is known as intrusion detection, and may be performed by an Intrusion Detection System (IDS) or a Threat Detection System (TDS), where an IDS may be a TDS or a TDS may be an IDS. For purposes of this disclosure, IDS and TDS are used interchangeably, although in some implementations one or both of the IDS or TDS may have additional or different functionality as compared to the other. The secured environment may comprise any combination of applications, application instances, infrastructure environments or portions thereof (e.g., storage, network(s), honeypots, firewalls, etc.), as well as any other suitable single component or multiple component systems or portions of systems that are monitored by a particular IDS/TDS for potential intrusions and threats.

IT security can be achieved on several layers. Some, but not all, are described herein. One technique may provide automatic countermeasures in operations (e.g., firewalls, packet filters, demilitarized zones (DMZs)) to ensure attackers cannot communicate with an instance of an application with potentially malicious content. Intrusion detection systems (IDSs as described above) identify malicious activities in the infrastructure of, for example, an enterprise system. The IDS can monitor and analyze any number of sources, including firewall logs, internal network data and logs, operating system activities, and application logs. Honeypots simulate a valuable target for attackers within a network, and can provide a fake productive system with fake, dummy, obscured, or otherwise non-productive data. Additionally, the honeypots can be associated with monitoring mechanisms deployed to observe the attacker's behavior.

The advantages of these systems are multi-fold. The systems bind attackers' resources, analyze attacker techniques to allow for identification of weak points in the landscape configuration, obtain the attackers' identity (e.g., IP addresses, attempted login names, etc.), and act as a data source for the IDS systems. However, the solutions also have significant shortcomings. For example, the IDS represents a passive element used to inform administrators, such that administrators then need to manually take countermeasures to stop any identified attack or intrusion. Consequently, unnecessary delays may exist after particular malicious activity is identified. Further, the systems described above may allow the attacked systems to be taken down or offline as one possible countermeasure, but such an action greatly reduces and violates business continuity requirements for availability of the attacked systems. In case of a Denial of Service (DoS) attacks, the usual countermeasure may be to block the source of the traffic or to add additional instances of the application to counteract the high load. For large business or other complex systems, simply adding instances may create an unreasonable load on the infrastructure of the application, along with cost and processing issues as resource requirements skyrocket. With regard to honeypots, attackers may immediately or quickly recognize a honeypot and avoid actively attacking it.

The present solution addresses issues found with the security as it relates to modern business and other complex applications and services. In many cases, such applications and services may represent composites of several independently deployed components with strong functional dependencies, such that typical lifecycle operations are difficult to implement (e.g., relocating resources, duplicating starting and stopping applications for dependencies sake, etc.). Thus, the present solution provides advantages by removing issues caused by lack of business or provider continuity in cases of a DoS attack, where a system is about to be compromised and needs to be disconnected from the network, or in cases where a system has already been compromised. Further, the present solution addresses the long timespans between intrusion detection and the issuance of countermeasures, as well as the weakness of recognizable honeypots.

Automated systems management continues to grow for application and service providers, allowing quicker detection and analysis of potentially malicious activity. Landscape operation management applications, or landscape management applications, may be deployed across enterprise systems and can execute complex runtime application operations including managing the dependencies between available components among the infrastructure layers the application or service uses. The present solution incorporates the lifecycle operation manager associated with such enterprise and other complex systems along with an IDS or TDS to immediately act upon identified potential malicious activity.

The IDS retrieves, intercepts, or otherwise accesses data relevant to its analysis from a particular secured environment monitored by the IDS. In situations where an attack is identified, the IDS can trigger a countermeasure execution (CE). The IDS's attack notification contains at least the following information: an application identifier of the attacked system, an attack type, and a confidence level that the detection is correct. The countermeasure execution internally holds or includes a model representing the landscape, the applications, and the components of the applications. Further, the model includes a mapping of the applications to an application type and the knowledge of how different operations can be executed.

Based on, for example, the attack type, the attacked application type, the confidence, and further context information, a predefined set of operations can be executed within the landscape to mitigate the threat. In one example, the context information may be the time an attack appears. For example, it may be unlikely that an administrator is available to respond to a warning provided by the IDS in the middle of the night. Furthermore, fewer users may be affected from an automated countermeasure if it does not work perfectly when it occurs during a non-peak or non-working hour. Thus, the CE may perform a completely autonomous countermeasure, while during usual business hours, an administrator's decision or approval may be required to execute potentially disruptive countermeasures. Various types of approaches may be used to come to a particular decision, such as rules engines, fuzzy logical approaches, and/or neural networks, among others. Optionally, an administrator or trusted user's approval may be required to confirm particular countermeasures, particularly where the confidence level is relatively low.

Different attacks and appropriate operations may be defined or associated to mitigate such threats. Some example attacks, attacked assets, and mitigation operations are described herein.

In a first example, an attack may be a DoS attack exploiting either a bug in an application or component thereof, or that tries to overload the network's and infrastructure's capacity. The asset trying to be compromised in this situation may be business or uptime continuity. In such an instance, the operations performed may be to copy the application under attack, either by reinstalling the application and copying the productive (e.g., business or sensitive) data and/or configurations associated with the original application, or by cloning an image or stored version of the application. Using the operations of the lifecycle operations manager, the copied application can be made available at a different endpoint than the original version of the application. For example, at least one of the hostnames, identifiers, and/or IP addresses associated with the copied application can be modified. As the lifecycle operations manager is aware of the existing landscape and the one or more dependencies upon which the attacked application is based or associated, the configurations of any related or associated systems and/or applications with a dependency relationship can be adjusted, depending on the attacked system. Users interacting with the attacked application can be informed about the new endpoint via a second channel (e.g., email, chat message, text message, etc.) known by the lifecycle operations manager or other notification system. In some instances, particularly where the application is associated with a portal (e.g., an enterprise portal), one or more navigation targets (e.g., entrance links) associated with the application on the portal page can be updated, such that any future attempted accessing of the application or system through those locations will result in the copied and protected application or service being called. Alternatively, the navigation target may be associated with a proxy call via a backend or additional operation, where the proxy call is updated to the second endpoint associated with the copied application. Alternatively, no navigation target may be used, and instead only a proxy may be used to access the endpoints. In such instances, the proxy may be adapted to take users to the second endpoint after the countermeasures have been executed. In doing so, the copied application replaces the original, attacked operation and the asset (i.e., business continuity) is maintained.

A second example occurs where a productive system is determined by the IDS to already have been compromised or is about to be comprised, such as when the attacker is in and is about to search or otherwise access relevant data. The assets being affected in such cases are productive/sensitive data and business continuity, as the system would normally be taken offline to protect from the accessing.

Again, in response to the IDS detecting the intrusion and potential compromising of sensitive data, a notification to the lifecycle operations manager can be sent, which can then manage the lifecycle operations associated with the present solution. Again, a copy of the application instance can be created, either by reinstalling and copying into the reinstalled instance the productive data associated with the original instance (e.g., if the data is confidently determined not to be compromised), or by using an image of the application instance from a backup storage old enough to ensure the data has not been compromised. The copied application can be made available under a different endpoint from the original endpoint of the original application, and configurations associated with one or more dependent or related applications, systems, or services can be updated accordingly. The compromised original application can be disconnected from the network and made unavailable for access. By doing so, the assets are preserved as no data can be retrieved, and business continuity is maintained by replacing the system.

In an alternative implementation with regard to the compromised system, a similar situation may arise where the issue arose due to an operating system bug. In this instance, a copy of the application may be made by reinstalling the application instance on another operating system or version and/or in another context. The new copy of the application can then be synced with the productive data from either the potentially compromised system or from a backup location. The system under attack can be disconnected, and the copied application can be made available under the original first endpoint after fixing or correcting the issue that allowed the potential compromise.

In another example, an attacker may find a productive system's ID, name, or IP address by social engineering or from information obtained after other attacks in different systems. In such instances, the attacker may be able to avoid existing honeypots and access or attempt to access productive systems. The asset is protection of the productive system, but also the use of honeypots as a valid source of countermeasure against the attackers' techniques and gaining information regarding their identities. The operations can occur when an attack against the system is observed and/or where the system has already been comprised.

Initially, a copy of the application can be created either by reinstalling the application instance and copying the current productive data (e.g., if confident the productive information remains uncorrupted or accessed), or using an image of the application instance using backup storage. The copied application can be made available at a second endpoint using different hostnames, identifiers, and IP addresses, among others. Similar to prior examples, the configuration of other systems/applications depending on the system under attack can be updated as well. Users can be informed of the new endpoint, either through email, via a portal page associated with access to the application, or adjusting other entry points, navigation targets, entrance links, or proxies providing access to the application.

In the present example, further operations can be performed to allow for additional honeypots to capture the current attacker. In a first example operation, a new or existing honeypot can be made available, either by installing a new honeypot or by copying an existing one. The attacked application can be disconnected from the network, and the new honeypot can be made available at the first endpoint associated with the original application instance. In a second example operation, dummy, false, obfuscated, or other non-productive data can be copied to the application instance under attack to replace the existing productive information. Honeypot monitoring tools can then be installed or activated on the system under attack. In both instances, due to the replacement of the original system with a honeypot, the probability that the attacker will use the system for a longer time increases as the system was not initially identified as a honeypot, thereby leading the attacker to believe any data accessed is productive data. Based on that belief, the attacker may spend longer time within the honeypot before, if ever, realizing the change, providing significant information to IT security systems and personnel.

The present solution provides a number of advantages over existing solutions. Some include the fact that present systems do not combine automatic countermeasures with an IDS system, nor do such systems combine applications' runtime operations and configurations, along with the lifecycle operations management and landscape knowledge gained from the IDS system. These combined solutions allow a smarter and automatic response to attacks and intrusions while limiting to removing any issues related to uptime and operational continuity. Further, in instances where normal users access through a navigation target (e.g., proxy, entrance link, or any other forwarding operation (e.g., a portal page)), no (or extremely minimal) disruption to user accessing of the application or service will be recognized or felt by the users. Existing solutions further rely on an administrator being available to manually trigger available countermeasures due, primarily, to the effect of countermeasures on things such as operational continuity for other users. Due to the countermeasures being used in combination with the lifecycle operations manager to keep new and safe versions of the attacked application available, the risk of the automatic countermeasures are greatly reduced. Still further, automatic countermeasures in these solutions can act immediately and without delay to reduce to standard timespan for addressing potential attacks. Honeypots are also dynamically generated and used to replace productive systems in these solutions, avoiding the ability of attackers to simply avoid known honeypots. Instead, the dynamically generated honeypots are located at endpoints where the attacker is currently involved, causing those honeypots to appear more trustworthy and of value to the attacker.

Turning to the illustrated implementation, FIG. 1 is a block diagram illustrating an example system 100 for automatically triggering countermeasures through combined interactions of an intrusion detection system 130 and a lifecycle operations system 102. System 100 is a single example of a possible implementation, with alternatives, additions, and modifications possible for performing some or all of the described operations and functionality. As illustrated in FIG. 1, system 100 is associated with systems capable of sharing and communicating information across devices and systems (e.g., lifecycle operations system 102, intrusion detection system 130, secured environment 160, client 170, and enterprise portal 190, among others, via network 120). Although components are shown individually, in some implementations, the functionality of two or more components, systems, or servers may be provided by a single component, system, or server. Further, additional components may be included in alternative implementations that perform at least a part of the functions of the illustrated components. For example, at least a portion of the components illustrated in intrusion detection system 130 may be stored remotely from the system 130, or at another location accessible via network 120.

As used in the present disclosure, the term "computer" is intended to encompass any suitable processing device. For example, client 170, lifecycle operations system 102, and intrusion detection system 130 may be any computer or processing device such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general purpose computers, as well as computers without conventional operating systems. Client 170 may be any system which can request data, execute an application, and/or interact with the intrusion detection system 130, the lifecycle operations system 102 and/or the enterprise portal 190, along with portions of the secured environment 160. The client 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, any real-time OS among others.

Lifecycle operations system 102 may be associated with the execution of one or more lifecycle operations performed by one or more of the components included in the secured environment 160, including one or more application instances 162 and honeypots 164, among others. The lifecycle operations system 102 may also manage other infrastructure components, one or more networks, and other components, both inside and outside the secured environment 160. In one example, the lifecycle operations system 102 may include or be associated with landscape management software that helps users reduce the total cost of ownership (TCO) of their system and improve business agility by simplifying and automating the efforts required to configure, provision, deploy, monitor, and manage their systems in both physical and virtualized infrastructures. One example of such a system may be SAP's Landscape Management, Enterprise Edition, among others. The lifecycle operations system 102 can manage the lifecycle of one or more components based on input or instructions from administrators, users, particular systems or applications, or based on any suitable instructions identified by or received at the lifecycle operations system 102. As described herein, the lifecycle operations system 102 can also manage lifecycle operations based on inputs and instructions from the intrusion detection system 130. Any number of lifecycle operations may be available, with a few examples provided herein.

System copy: A system (e.g., comprising n application instances, databases, networks, etc.) is completely copied (e.g., data, configuration, application code, etc.). The name and identifier of the system and service endpoints associated therewith may or may not be changed.

System refresh: Operational and customer data of a previously copied system is updated by the data of the original/source system.

System rename: A system's identifier, name, and/or its endpoints are renamed.

System creation: A system is created either by a manual installation or via the use of a predefined appliance deployed on a virtual machine manager/hypervisor, or by any other automation mechanism using, e.g., automation scripts.

In general, the lifecycle operations system 102 can manage these operations. In some instances, the lifecycle operations system 102 can receive requests from client 170 (e.g., via client application 176) or by the intrusion detection system 130 and provide responses or perform actions in response to those requests. As illustrated, the lifecycle operations system 102 includes an interface 104, a processor 106, a lifecycle operation manager 108, and memory 112.

Interface 104 is used by the system 102 for communicating with other systems in a distributed environment—including within the environment 100—connected to the lifecycle operations system 102 and/or network 120, e.g., client(s) 170, one or more components of the secured environment 160, or the intrusion detection system 130, as well as other systems or components communicably coupled to the network 120. Generally, the interface 104 comprises logic encoded in software and/or hardware in a suitable combination and operable to communicate with the network 120 and other communicably coupled components. More specifically, the interface 104 may comprise software supporting one or more communication protocols associated with communications such that the lifecycle operations system 102, network 120, and/or interface's hardware is operable to communicate physical signals within and outside of the illustrated environment 100.

Network 120 facilitates wireless or wireline communications between the components of the environment 100 (e.g., between the system 102 and the intrusion detection system 130 and/or client 170, among others) as well as with any other local or remote computer, such as additional mobile devices, clients, servers, remotely executed or located portions of a particular component, or other devices communicably coupled to network 120, including those not illustrated in FIG. 1. In the illustrated environment, the network 120 is depicted as a single network, but may be comprised of more than one network without departing from the scope of this disclosure, so long as at least a portion of the network 120 may facilitate communications between senders and recipients. In some instances, one or more of the illustrated components (e.g., the lifecycle operations system 102) may be included within network 120 as one or more cloud-based services or operations. The network 120 may be all or a portion of an enterprise or secured network, while in another instance, at least a portion of the network 120 may represent a connection to the Internet. In some instances, a portion of the network 120 may be a virtual private network (VPN). Further, all or a portion of the network 120 can comprise either a wireline or wireless link. Example wireless links may include 802.11a/b/g/n/ac, 802.20, WiMax, LTE, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the lifecycle operations system 102, in particular those related to executing the lifecycle operation manager 108. Specifically, the processors 106 execute the algorithms and operations described in the illustrated figures, as well as the various software modules and functionality, including the functionality for sending communications to and receiving transmissions from the intrusion detection system 130 and/or clients 170, as well as to other devices and systems. Each processor 106 may have a single core or multiple cores, with each core available to host and execute an individual processing thread. In some instances, a cloud-based solution may use one or more remotely or otherwise available processors 106 and their cores to allow for further operations and optimization of operations via parallel processing. As noted, the processor 106 executes the operations of and those associated with the lifecycle operations system 102, particularly in executing the lifecycle operation manager 108 and its functionality.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The lifecycle operation manager 108 (or "LOM" 108), may be any application, framework, agent, or other software capable of managing the lifecycle operations associated with one or more components included in the secured environment 160. In some instances, the LOM 108 may include one or more sub-modules, agents, or software for executing its operations, including a countermeasure module 110 and a honeypot generator 111. These components may be distinct subparts of the LOM 108, remotely executed agents or software, and/or functionality inherent to the LOM 108, as suitable for different implementations.

As noted, the LOM 108 manages the lifecycle operations of at least one component included within the secured environment 160, including one or more application instances 162. In some instances, the LOM 108 may also be a part of the secured environment 160, where the secured environment 160 is defined as a group of components monitored by the intrusion detection system 130, described below. The LOM 108 may be a dedicated component managing the lifecycle of a plurality of components by causing one or more lifecycle operations to be executed in association with those components. In some instances, the LOM 108 may cause the lifecycle operations to be performed based on a particular schedule for one or more components, including pools of components. In some instances, the LOM 108 may react to application and/or user input or requests for particular lifecycle operations to be performed. In the present solution, the LOM 108 can interact with the intrusion detection system 130 to perform one or more automatic countermeasure operations in response to detected intrusions and/or attacks. The countermeasure module 110 of the LOM 108 can interpret instructions and/or information provided by the intrusion detection system 130 to determine the corresponding countermeasure to be taken. For example, in response to a potential compromised application as identified by the intrusion detection system 130, a notification of the application instance's ID, hostname, and/or IP address may be provided to the LOM 108, along with the information about the attack or issue. In some instances, the intrusion detection system 130 may also provide a specific instruction as to the particular countermeasures to be taken, while in other instances, the LOM 108 and its countermeasure module 110 may be responsible for that determination.

The countermeasures performed by the LOM 108 and its countermeasure module 110 may include creating a copy of the attacked application (or application instance) and making the copied application available at a different endpoint than originally available (i.e., the first endpoint), where an endpoint associated with the application is a unique identifier of the location or accessibility of the application. The LOM 108 can use its lifecycle operations to copy, create, and/or rename the new version of the application, and can assign or associate the copied application to the new, second endpoint. Relevant production data (or other data relevant to the application) can be copied or synced from the original application (e.g., in situations where the productive data of the original system has not been compromised), or back up data can be accessed and used to restore the copied application as close to the original application as possible.

As enterprise and other complex systems may involve multiple, related applications, services, and systems dependent upon or related to the attacked application, the LOM 108 can manage adjustments to the configuration of those related applications/systems to associate the new second endpoint of the copied application with those other systems/applications. This may include modifying settings, configurations, or code associated with one or more calls made by or to the other systems/applications. As the copy of the application should include the same calls and interactions as the original version, only calls to the new copy of the application may need to be updated with the second endpoint.

Once the new version of the application is created and available, the LOM 108 may end or close the original attacked application, or the LOM 108 may otherwise remove it from the network to remove access to the attacked and potentially compromised data. In some instances, the LOM 108 may generate a notification to users about the new copy of the application and its respective endpoint via a second channel, such as email. Alternatively, the LOM 108 may cause one or more navigation targets (e.g., entrance links, etc.) associated with the copy of the application to be directed to copy as opposed to the original application. For example, the navigation target may be a link on a portal page, where the link is updated to the second endpoint in connection with the new copy of the application. In other examples, the navigation target may be proxy entrance that directs incoming requests to the appropriate endpoint. In such instances, the first endpoint of the attacked application may be modified to the second endpoint of the copied application. In other instances, a redirect service may be used to redirect traffic via the navigation target which would normally be delivered to the first endpoint to cause traffic to be delivered to the second endpoint, instead. Other suitable options may be also be used.

In combination with those actions, the LOM 108 includes a honeypot generator 111, where the honeypot generator 111 can manage the dynamic generation of a honeypot in response to a detected attack or compromised system. In some instances, a honeypot (e.g., honeypot 164) can be dynamically generated in connection with the countermeasure operations. The honeypot generator 111 can manage the creation and configuration of the generated honeypot. In one instance, a new honeypot is made available, either by installing a new honeypot or by copying an existing honeypot. When the attacked application is disconnected from the network, the new honeypot can be made available at the same endpoint as the original application (e.g., same hostname, IP address, system ID). Alternatively, dummy or other non-productive data can be copied into the attacked system and honeypot monitoring tools can be installed on the original system. In doing so, the attacker may not realize that the data is not the real data, and may continue to interact with the honeypot as additional information is gathered.

As illustrated, the lifecycle operations system 102 includes memory 112. Memory 112 may represent a single memory or multiple memories. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects or data (e.g., the application and data images 113 and information defining the system landscape 114, among others), including financial data, user information, administrative settings, password information, caches, applications, backup data, repositories storing business and/or dynamic information, and any other appropriate information associated with the LOM 108 and/or the lifecycle operations system 102, including any parameters, variables, algorithms, instructions, rules, constraints, or references thereto. Additionally, the memory 112 may store any other appropriate data, such as VPN applications, firmware logs and policies, firewall policies, a security or access log, print or other reporting files, as well as others. While illustrated in memory 112, one or both of the application and data images 113 or the system landscape data 114 may be located at one or more remote locations within (or outside of) environment 100.

The application and data images 113 comprises stored backup information for current and prior versions of applications and their associated data. Such information may be stored in any suitable backup system, and can be accessible to and used by the LOM 108 and countermeasure module 110 to create new versions of attacked applications and to sync those created applications with up-to-date versions of the productive or current data.

The system landscape data 114 is a set of data maintained or accessible to the lifecycle operations system 102 and the LOM 108, where the relationships and interactions between different landscape components are known and described. In relation to a change at one of the particular applications that is being attacked, those applications, services, and other related components can be updated to refer to or understand the new endpoint associated with the copied application.

Intrusion detection system 130 is any system, server, or set of servers associated with monitoring one or more components within a secured environment (e.g., secured environment 160). In general, an intrusion detection system (IDS) is a software application or system that monitors a network or systems for malicious activity or policy violations. Any detected activity or violation can be reported to an administrator, can be logged as a potential issue, or can trigger one or more countermeasure actions. Collectively, the actions taken by the intrusion detection system 130 may be called mitigation actions. In some instances, the intrusion detection system 130 may include or be associated with a threat detection system specifically monitoring for one or more threats to the secured environment 160. Any suitable detection and prediction system may be used. In some cases, a pattern-based intrusion detection algorithm may be executed by an intrusion detection application 136 executed by the intrusion detection system 130.

As illustrated, the intrusion detection system 130 includes an interface 132, a processor 134, the intrusion detection application 136, and memory 144. Interface 132 and processor 134 may be similar to or different from interface 104 and processor 106, respectively. Similarly, memory 144 may be similar to or different than memory 112, and can include an intrusion rule set 146, a set of collected logs 148, and a set of mitigation action rules 150. The intrusion rule set 146 can include rules associate with determinations of whether one or more intrusions, threats, or other malicious activities are occurring or have occurred. In some instances, the intrusion rule set 146 may include a set of static rule patterns which define particular patterns or indices of intrusions and attacks. These static rule patterns can be defined by known attack vectors (e.g., attack vector 166) and combinations of factors, particular patterns of network traffic as they relate to one or more components or component types, as well as any other suitable and predefined pattern or rule set. The intrusion rule set 146 may also be associated or include a set of dynamic rule patterns which may be associated with a history of interactions and monitored activity within the secured environment 160, such that deviations from such historical performance and other anomalies may trigger an indication of a potential attack. Through learning mechanisms over time, including reactions and next steps performed by administrators and security professionals, the system 130 may be able to update the dynamic rule patterns based on such actions, e.g., through use of the machine learning module associated with the intrusion detection application 136.

Referring to the intrusion detection application 136, the application 136 may be any application, framework, agent, or other software capable of monitoring the secured environment 160 and its application instances 162 and other components, as well as the LOM 108, for potential attacks or intrusions based on the intrusion rule set 146. In some instances, once a potential malicious action is detected, the intrusion detection application 136 can trigger one or more mitigation actions in response. In the present solution, those mitigation actions may include providing information to the countermeasure module 110 of the LOM 108, which in turn can perform the described interactions for performing lifecycle operations to mitigate the damage and potential damage caused by the attack, while in some instances, also dynamically generating one or more honeypots 164 as a counterattack and counter-surveillance against the attacker.

In some instances, the intrusion detection application 136 may include one or more sub-modules, agents, or software for executing its operations, including a log collector 138, an intrusion analyzer 140, and a mitigation action module 142. These components may be distinct subparts of the intrusion detection application 136, remotely executed agents or software, and/or functionality inherent to the intrusion detection application 136, as suitable for different implementations. Further, these and any other components described herein may be separated or combined in other implementations.

The log collector 138 can perform operations associated with accessing and/or obtaining log files associated with any systems monitored by the intrusion detection application 136, including any of the components in the secured environment 160 and/or the LOM 108, where appropriate. The log files are collected and can be stored with the collected logs 148 of memory 144, or they may be stored in another location. In some instances, the log files may not be collected at the intrusion detection system 130, but instead at least some of the log files may be accessed or stored remotely. In some instances, the log collector 138 may also collect and/or access the logs associated with one or more operations performed by the LOM 108. The collected log files 154 may be text files, word processor documents, spreadsheets, database tables XML documents, or any other suitable format.

The intrusion analyzer 140 can perform the analysis on the collected logs 154 based on the intrusion rule sets 148. In some instances, the type of analysis and rules applied may differ based on a particular component being considered, an event or time at which the analysis is performed, or based on other information. In response to the analysis, the intrusion analyzer 140 can return information about whether one or more potential malicious activities have occurred within the monitored components based on the intrusion rule sets 148 applied and the collected logs 148.

In some instances, the mitigation action module 142 can, based on the identified intrusion detection by the intrusion analyzer 140, perform one or more suitable corresponding mitigation actions. The mitigation actions may include notifying a particular user or system of the identified potentially malicious activity, recommending an action to be taken, and/or automatically causing one or more countermeasures to be executed in response to the activity, such as those described in relation to the countermeasure module 110. Any suitable responsive mitigation action may be triggered that corresponds to the at least one identified malicious action. The mitigation action module 142 may take action automatically and without user input, thereby moving immediately to stem potential threats and intrusions to the secured environment 160. In some instances, the mitigation action module 142 can initiate or request initiation of the lifecycle operations at the LOM 108 and the countermeasure module 110 to react to the threat. The type of reaction or requested action can be determined based on a defined mitigation action rule in the mitigation action rule set 150. Alternatively, the countermeasure module 110 may receive information about the intrusion and determine, based on the particular application or application instance being attacked and/or on details of the attack, determine which particular countermeasures to deploy and how, including but not limited to creating a new copy of the application or system under attack. In some instances, how that creation of the new copy of the application is performed may be determined based on the type of intrusion and the likelihood that a particular application has been compromised based on the obtained data about the intrusion.

As illustrated, one or more clients 170 may be present in the example system 100. Each client 170 may be associated with one or more client applications 176. The client applications 176 may provide access or insight to either of the intrusion detection system 130 and/or the lifecycle operations system 102, as well as the secured environment 160 or its components in some instances. Further, the client application 176 may be any application that allows users to interact with the one or more application instances 162 within the secured environment 160. As illustrated, the client 170 may include an interface 172 for communication (similar to or different from interfaces 104, 132), a processor 174 (similar to or different from processors 106, 134), the client application 176, memory 180 (similar to or different from memory 114, 146), and a graphical user interface (GUI) 178.

The illustrated client 170 is intended to encompass any computing device such as a desktop computer, laptop/notebook computer, mobile device, smartphone, personal data assistant (PDA), tablet computing device, one or more processors within these devices, a virtual client associated with a cloud-based network or process, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with the client application 176, and an output device that conveys information associated with the operation of the applications and their application windows to the user of the client 170. Such information may include digital data, visual information, or a GUI 178, as shown with respect to the client 170. Specifically, the client 170 may be any computing device operable to communicate with any of the other systems in environment 100, including one or more of the intrusion detection system 130, the lifecycle operations system 102, one or more of the components of the secured environment 160, and/or other components via network 120, as well as with the network 120 itself, using a wireline or wireless connection. In general, client 170 comprises an electronic computer device operable to receive, transmit, process, and store any appropriate data associated with the environment 100 of FIG. 1.

GUI 178 of the client 170 interfaces with at least a portion of the environment 100 for any suitable purpose, including generating a visual representation of the client application 176, which in turn can present at least a portion of information associated with one or more of the other systems. In particular, the GUI 178 may be used to present results or feedback from the intrusion detection system 130, as well as information about the lifecycle operations managed by the LOM 108. GUI 178 may also be used to view and interact with various Web pages, applications, and Web services located local or external to the client 170, including those related to the application instances 162. By using the described solution, users interacting with particular application instances 162 which are under attack may not be aware of the attack taking place, and instead may be directed to a new or second endpoint associated with a copy of the original application instance during their interactions. In such instances, the backend lifecycle operations system 102 can ensure that operations are provided without or with minimal downtime by automatically transitioning users from the attacked application instance to a new, and protected, version, by managing the communication and request flows to the new version of the application instance 162. Generally, the GUI 178 provides the user with an efficient and user-friendly presentation of data provided by or communicated within the system. The GUI 178 may comprise a plurality of customizable frames or views having interactive fields, pull-down lists, and buttons operated by the user. For example, the GUI 178 may provide interactive elements that allow a user to view or interact with information related to the operations of processes associated with the various systems 102, 130, among others. In general, the GUI 178 is often configurable, supports a combination of tables and graphs (bar, line, pie, status dials, etc.), and is able to build real-time portals, application windows, and presentations. Therefore, the GUI 178 contemplates any suitable graphical user interface, such as a combination of a generic web browser, a web-enabled application, intelligent engine, and command line interface (CLI) that processes information in the platform and efficiently presents the results to the user visually.

In general, client application 176 may be any application capable of interacting with one or more of the described components, including the intrusion detection application 136 or the LOM 108. In some instances, different clients 170 and client applications 176 may have access to one, both, or neither of the different systems, including through different authorizations and authentications. In the illustrated example, client application 176 may be a web browser, mobile application, cloud-based application, or dedicated remote application or software capable of interacting with at least some of the illustrated systems via network 120 to request and subsequently present results of such interaction. Different clients 170 may be associated with different roles, where information about particular incidents and detected potential attacks are selectively provided to the client applications 176 corresponding to the users or administrators associated with the components at which the incidents occur or are otherwise associated. In other instances, a single client 170 could serve multiple or both use cases. For example, a client may have a UI combining data from lifecycle operations system 102 and intrusion detection system 130, as well as possibly the secured environment 160, within one view or related views. In still other instances, some clients 170 may only be associated with users executing particular application instances 162, who are unaware of and uninterested in particular attacks on their resources. Those clients 170 may access the application instances 162 directly through known links (e.g., uniform resource locators (URLs) or uniform resource identifiers (URIs)) or via a portal link 192 associated with, for instance, an enterprise portal 190 that acts as an entrance point or link to a particular application instance 162. The portal links 192 can be used to provide a direct link to an endpoint associated with a particular application instance 162, a redirect service that provides a redirect to the particular application instance 162 when selected, or a proxy entrance that directs incoming requests to the appropriate application instance 162, among others. Each application instance 162 may be associated with a particular endpoint 194 for the application or service. In such instances, the first endpoint of an original application instance 162 may be the attack vector 166 used by an intruder or attacker. In response to determining the attack vector, the intrusion detection application 136 and the countermeasure module 110 can perform their operations to create a new version of the application instance 162 associated with a new, second endpoint. This endpoint can differ from the first endpoint and be substituted for use in accessing the application. By changing the endpoint in various systems (e.g., the portal link 192, the redirect service, or the proxy entrance), the LOM 108 can remove the attack vector 166 and provide a new entrance to the application, such that the attack vector 166 is no longer associated with the attacked application.

Figure 2:
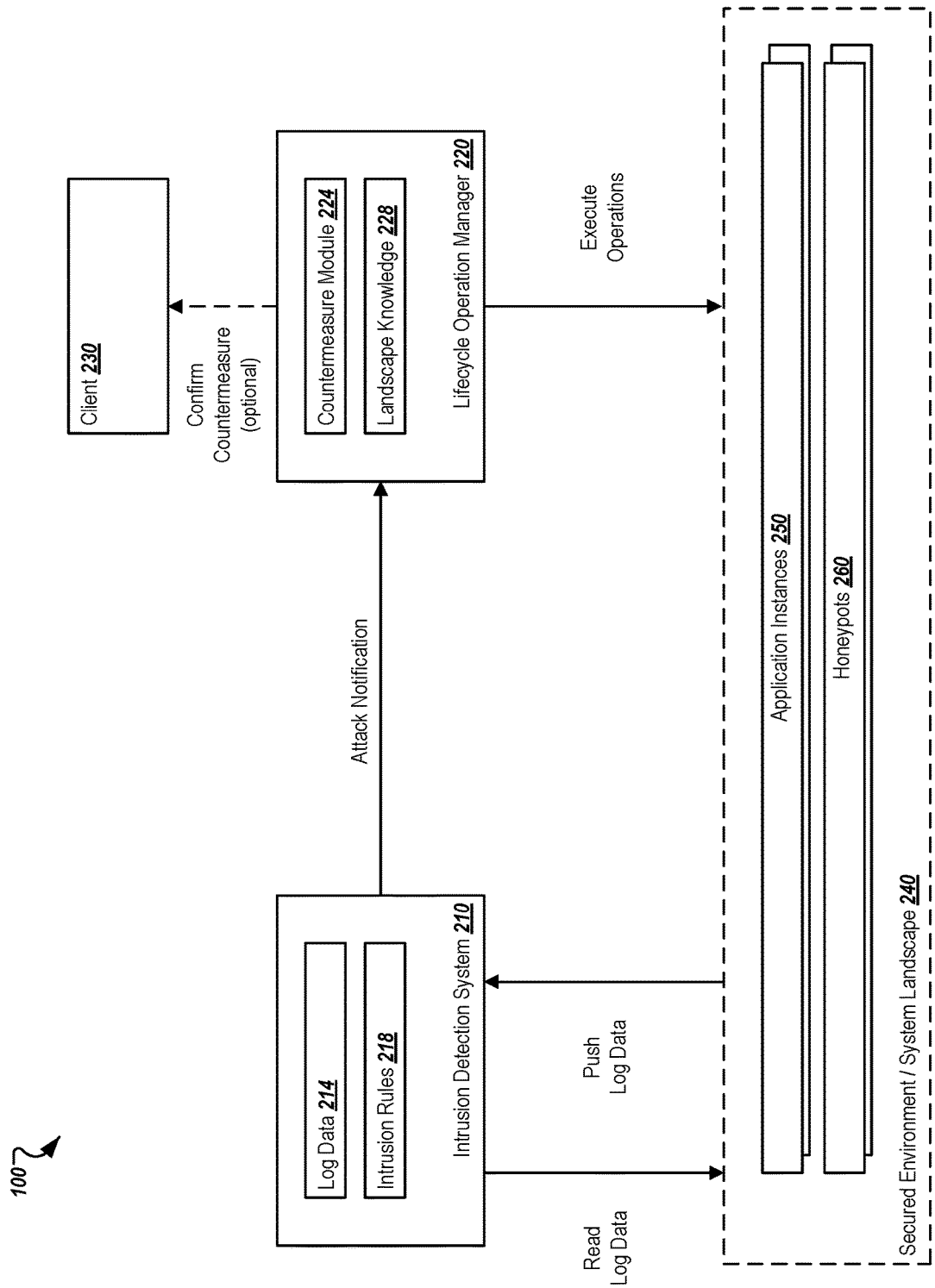
FIG. 2 is an overview of the example interactions and countermeasures occurring within an example environment.

FIG. 2 represents an example simplified overview of the interactions and countermeasures occurring within an example environment 100 in which the solution is present. As illustrated, the system 200 includes an intrusion detection system 210, a lifecycle operation manager 220, a secured environment/system landscape 240, and a client 230. One or more application instances 250, or other types of system components, execute within the secured environment 240. The intrusion detection system 210 monitors the operations of the application instances 250 and other components within the secured environment 240, either by directly accessing log data or other application data from the secured environment 240 or by receiving pushed information from those application instances 250. The intrusion detection system 210 can then store or maintain the log data 214, and can apply one or more intrusion rules 218 that are used to determine (1) whether an intrusion or attack has occurred and (2) if so, what responsive mitigation actions are to be taken to address those intrusions and attacks.

As described above, the mitigation actions performed in connection with the present solution relate to lifecycle operations performed by the lifecycle manager 220. The intrusion detection system 210 can then notify the lifecycle operation manager 220 of any identified attacks and intrusions, providing information about the particular application instance 250 (or other component) associated with the attack, as well as any other suitable information needed by the lifecycle operation manager 220 to take a further action. The lifecycle operation 220 includes a countermeasure module 224 used to identify and perform lifecycle operations reactive to the identified attack. In some examples, one or more countermeasures may be identified that may be disruptive to business continuity. In those instances, a client 230 (e.g., associated with an administrator) may be contacted to confirm whether a particular countermeasure can be launched. However, the solution provided herein may be able to avoid such user approval by insuring that the actions taken do not affect the business continuity and address the pending attack. In those instances, the lifecycle operation manger 220 can copy the application instance 250 under attack, associate the copied application with a different endpoint than the attacked application instance 250 is associated with, and disconnect the attacked application instance 250 from a network to avoid further intrusions. In some instances, the lifecycle operation manager 220, instead of simply disconnecting the attacked application instance 250, may generate one or more honeypots in place of the attacked application instance 250. In one example, the productive data of the attacked application instance 250 may be replaced with non-productive data (e.g., modified data, dummy data, scrambled data, etc.) and may then be associated with a honeypot monitoring system to obtain additional information from an intruder. Other types of honeypots 260 may be associated with attacked application instance 250 such that attackers may not immediately identify such systems as honeypots, but which provide seemingly real information. As the attackers interact with that data, the honeypot 260 (which may be associated with the same endpoint as the original attacked application instance 250) can collect data and intelligence about the attack while not allowing further intrusions and incursions to continue.

Figure 3:
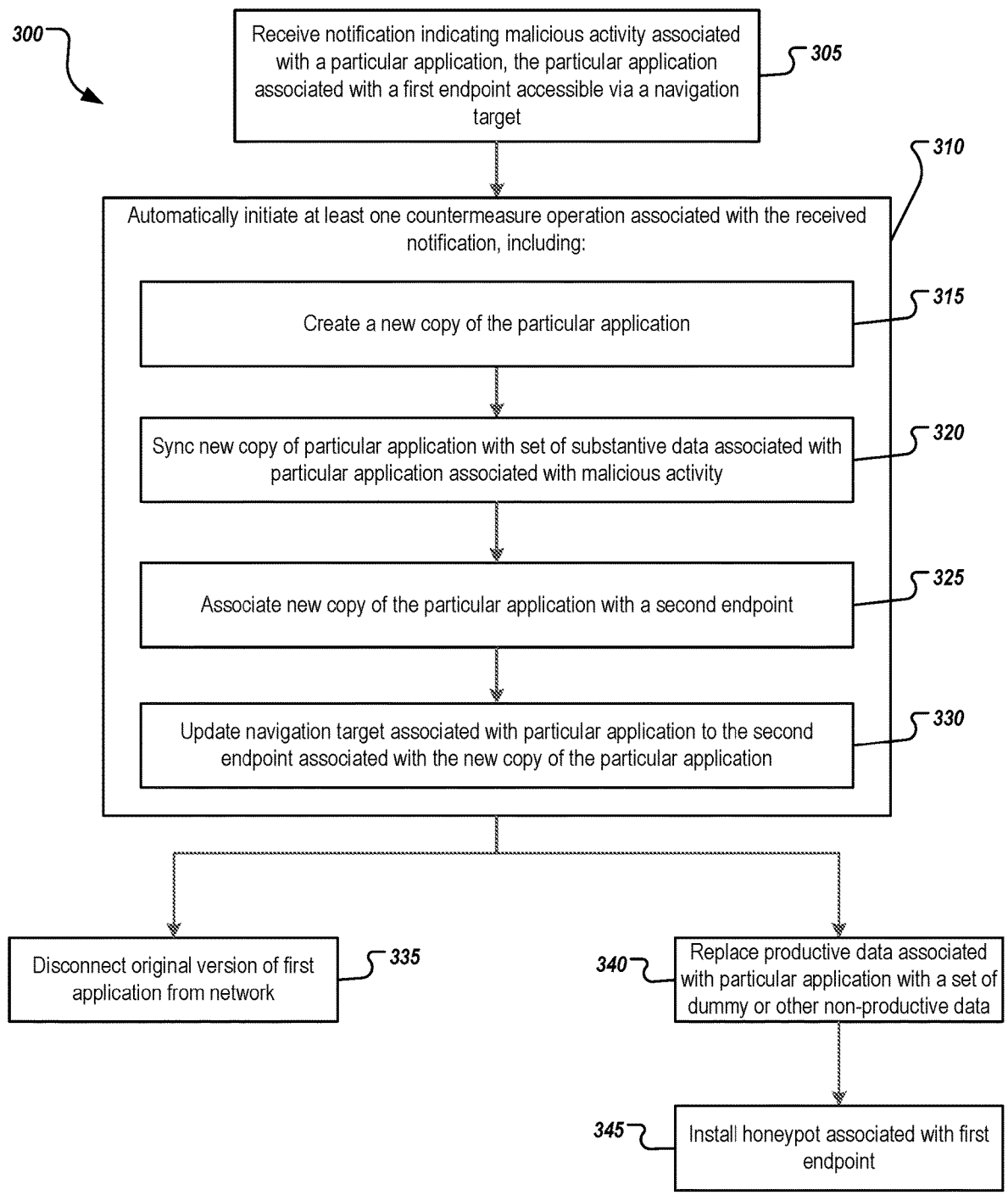
FIG. 3 is an example flowchart of a process for automatically performing lifecycle operations to mitigate identified threats through interactions between a threat or intrusion detection system and a lifecycle operations management system.

FIG. 3 is an example flowchart of a process 300 for automatically performing lifecycle operations to mitigate identified threats through interactions between a threat or intrusion detection system and a lifecycle operations management system. For clarity of presentation, the description that follows generally describes method 300 in the context of system 100 illustrated in FIG. 1. However, it will be understood that method 300 may be performed, for example, by any other suitable system, environment, software, and hardware, or a combination of systems, environments, software, and hardware as appropriate. In some instances, method 300 may be performed at or by an intrusion detection system, such as intrusion detection system 130 of FIG. 1, as well as at a lifecycle operations system 102.

At 305, a notification indicating malicious activity associated with a particular application or application instance is received, such as from the intrusion detection system. For purposes of this description, the particular application associated with the malicious activity is referred to as "the attacked application (instance)". In some instances, the notification can be received at a lifecycle operations system, where the notification includes specific information identifying the particular application, such as its system ID, its IP address, its hostname, and other relevant data. The attacked application is associated with a first endpoint at which the attacked application is accessible, such as through a navigation target. The navigation target may be a portal link on a portal page, a link associated with a redirection action to the endpoint of the particular application, or a proxy link that is used in lieu of the particular endpoint. Any other suitable type of link or entrance mechanism may be used in other instances.

At 310, at least one countermeasure operation associated with the received notification is automatically initiated. The countermeasure operation may be triggered by an intrusion detection system, or the lifecycle operations system or manager may trigger the operation in response to receiving the notification from the intrusion detection system. The at least one countermeasure operation can be triggered immediately in response to the notification, and can be performed without the need for human input or the approval of an administrator. In this way, the solution can be triggered immediately after determining a potential intrusion has occurred or that the system may be compromised shortly or that it has already been compromised.

Automatically initiating the at least one countermeasure can include creating a new copy of the particular application at 315, which can be performed using a system clone or system copy action managed by the lifecycle operations system. At 320, the newly generated copy of the particular application can be synced or otherwise associated with a set of substantive data and configuration associated with the particular application that has been identified as being associated with malicious activity. In some instances, the information from the attacked application may be copied where the intrusion detection system determines that the data is unlikely to have been compromised at the time where the notification is triggered. In other instances, productive information may be synced from an image of the application or a backup, such as where a determination is made that the data associated with the attacked application instance is potentially already compromised.

At 325, the new copy of the particular application can be associated with a second endpoint different than the first endpoint, where the second endpoint defines how and where the new copy of the application instance is accessed. By making the second endpoint different than the first endpoint, any attacks that were able to access the first endpoint may not be aware of or able to access the second endpoint. In connection with the association to the second endpoint, the navigation target associated with the new copy of the particular application can be updated at 330 to allow access to the second endpoint. Once done, users may access the application through the newly copied application instance, in many instances without knowing that the application instance has changed or that any issues have occurred. By doing so the solution allows for automatic and transparent protection when intrusions and attacks occur.

In some instances, the original version of the application instance can be disconnected from the network at 335, thereby removing the ability of attackers to access the application instance and/or any sensitive or productive data associated therewith. Alternatively, the application instance at the first endpoint can be turned into a honeypot or associated with a honeypot system to allow for counterattack countermeasures. In those instances, at 340 the productive data associated with the attacked application instance can be replaced with a set of dummy or other non-productive data. At 345, additional monitoring tools might be installed for the use as a honeypot which can be associated with the first endpoint. As attackers interact with the dummy data, they can be monitored by the honeypot so that defensive techniques and insight can be identified and discovered through monitoring of the intruders. Such dynamic honeypots provide significant advantages over predefined honeypots in that attackers are less likely to realize that such a modification to the attacked application instance (or a modified application instance) at the first endpoint is not the real application but instead a honeypot added after the intrusion is identified. Because the endpoint was previously valid, the attacker is less likely to register the change. By adding the dummy data, the original attacked application can become a honeypot even without the installation of the monitoring tools, in that the attacker may be attracted to the application instance associated with the first endpoint when the attacked application instance no longer includes productive data.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method performed by one or more processors, the method comprising:

receiving, at a lifecycle operation manager, a notification from an intrusion detection system indicating a malicious activity associated with a particular instance of an application included in an enterprise software environment monitored by the intrusion detection system, wherein the particular instance of the application is available for accessing at a first endpoint, the particular instance of the application is accessible at the first endpoint via a navigation target, the navigation target sending requests to access the application received at the navigation target to the first endpoint, wherein the malicious activity is associated with a particular attack vector;

in response to receiving the notification, automatically and without user input, executing, by the lifecycle operation manager, countermeasure operations to maintain services provided by the particular instance of the application, the countermeasure operations including:

when determining that the particular attack vector is the first endpoint for accessing the particular instance of the application, creating a copy instance of the particular instance of the application, wherein creating the copy instance of the particular instance of the application comprises moving the created copy instance of the particular application into a new system context excluding the particular attack vector associated with the particular instance of the application;

associating the copy instance of the particular instance of the application with a second endpoint different than the first endpoint;

updating the navigation target to cause the navigation target to redirect requests to the second endpoint to access the new copy instance; and redirecting a request received at the navigation target for the particular instance of the application to the second endpoint to access the copy instance of the application.

2. The method of claim 1, wherein the navigation target is associated with a proxy forwarding requests to the first endpoint.

3. The method of claim 1, wherein the navigation target is associated with a redirect pattern to the first endpoint.

4. The method of claim 1, wherein creating the copy instance of the particular instance of the application comprises reinstalling the particular instance of the application based on an image of the particular instance of the application from a backup storage and copying productive data and a configuration associated with the particular instance of the application.

5. The method of claim 1, wherein the first and second endpoints represent at least one of a particular uniform resource locator (URL) or a particular uniform resource identifier (URI) associated with the particular instance of the application and the copy instance of the particular application.

6. The method of claim 5, wherein the navigation target through which the first endpoint is accessible comprises a link within a portal page in an enterprise portal or any other across system access page to the particular URL or URI associated with the first endpoint of the particular application, and wherein updating the navigation target comprises updating the link within the portal page to a URL or URI associated with the second endpoint of the copy instance of the particular application.

7. The method of claim 1, where the second endpoint is generated by modifying at least one of a hostname, an identifier, and an Internet Protocol (IP) address associated with the first endpoint.

8. The method of claim 1, further comprising disconnecting the particular instance of the application from a network through which the particular instance of the application is accessed or moving the particular instance of the application to a quarantine network area.

9. The method of claim 1, further comprising, after creating the copy instance of the particular instance of the application, associating a honeypot with the first endpoint associated with the particular instance of the application.

10. The method of claim 1, further comprising, after creating the copy instance of the particular instance of the application:
replacing productive data in the particular instance of the application associated with the malicious activity with non-productive data at the first endpoint;
installing at least one honeypot monitoring tool in a system executing the particular instance of the application at the first endpoint; and
allowing access to the non-productive data at the first endpoint monitored by the at least one honeypot monitoring tool.

11. The method of claim 1, further comprising:
dynamically generating honeypots to replace applications in the enterprise software environment, wherein a first honeypot from the honeypots is associated with the first endpoint associated with the particular instance of the application to acquire data from an attacker associated with the malicious activity to be recognized; and
associating the generated honeypots with endpoints associated with the applications, wherein the attacker is determined to be involved in current activities with the applications by accessing via the endpoints.

12. The method of claim 1, wherein
in response to determining the attack vector,
updating occurrences of the first endpoint in various systems in the enterprise software environment by removing the attack vector corresponding to the first endpoint and replacing with the second endpoint, wherein after updating, the attack vector is no longer associated with the particular instance of the application being attacked.

13. The method of claim 1, wherein the navigation target is provided on a portal page separate from the particular instance of the application.

14. A system comprising:
at least one processor; and
a memory communicatively coupled to the at least one processor, the memory storing instructions which, when executed, cause the at least one processor to perform operations comprising:
receiving, at a lifecycle operation manager, a notification from an intrusion detection system indicating a malicious activity associated with a particular instance of an application included in an enterprise software environment monitored by the intrusion detection system, wherein the particular instance of the application is available for accessing at a first endpoint, the particular instance of the application is accessible at the first endpoint via a navigation target, the navigation target sending requests to access the application received at the navigation target to the first endpoint, wherein the malicious activity is associated with a particular attack vector;
in response to receiving the notification, automatically and without user input, executing, by the lifecycle operation manager, countermeasure operations to maintain services provided by the particular instance of the application, the countermeasure operations including:
when determining that the particular attack vector is the first endpoint for accessing the particular instance of the application, creating a copy instance of the particular instance of the application, wherein creating the copy instance of the particular instance of the application comprises moving the created copy instance of the particular application into a new system context excluding the particular attack vector associated with the particular instance of the application;
associating the copy instance of the particular instance of the application with a second endpoint different than the first endpoint;
updating the navigation target to cause the navigation target to redirect requests to the second endpoint to access the new copy instance; and
redirecting a request received at the navigation target for the particular instance of the application to the second endpoint to access the copy instance of the application.

15. The system of claim 14, wherein creating the copy instance of the particular instance of the application comprises reinstalling the particular instance of the application and copying productive data and a configuration associated with the particular instance of the application or using an image of the particular instance of the application from a backup storage, wherein the malicious activity is associated with an attack vector.

16. The system of claim 15, wherein the first and second endpoints represent at least one of a particular uniform resource locator (URL) or a particular uniform resource identifier (URI) associated with the particular instance of the application and the copy instance of the particular application.

17. The system of claim 16, wherein the navigation target through which the first endpoint is accessible comprises a link within a portal page in an enterprise portal or any other across system access page to the particular URL or URI associated with the first endpoint of the particular instance of the application, and wherein updating the navigation target comprises updating the link within the portal page to a URL or URI associated with the second endpoint of the copy instance of the particular application.

18. The system of claim 15, where the second endpoint is generated by modifying at least one of a hostname, an identifier, and an Internet Protocol (IP) address associated with the first endpoint.

19. The system of claim 15, the operations further comprising disconnecting the particular instance of the application from a network through which the particular instance of the application is accessed or moving the particular instance of the application to a quarantine network area.

20. A non-transitory computer-readable medium storing instructions which, when executed, cause at least one processor to perform operations comprising:
receiving, at a lifecycle operation manager, a notification from an intrusion detection system indicating a malicious activity associated with a particular instance of an application included in an enterprise software environment monitored by the intrusion detection system, wherein the particular instance of the application is available for accessing at a first endpoint, the particular instance of the application is accessible at the first endpoint via a navigation target, the navigation target sending requests to access the application received at the navigation target to the first endpoint, wherein the malicious activity is associated with a particular attack vector;

in response to receiving the notification, automatically and without user input, executing, by the lifecycle operation manager, countermeasure operations to maintain services provided by the particular instance of the application, the countermeasure operations including:

when determining that the particular attack vector is the first endpoint for accessing the particular instance of the application, creating a copy instance of the particular instance of the application, wherein creating the copy instance of the particular instance of the application comprises moving the created copy instance of the particular application into a new system context excluding the particular attack vector associated with the particular instance of the application;

associating the copy instance of the particular instance of the application with a second endpoint different than the first endpoint;

updating the navigation target to cause the navigation target to redirect requests to the second endpoint to access the new copy instance; and redirecting a request received at the navigation target for the particular instance of the application to the second endpoint to access the copy instance of the application.

\* \* \* \* \*